(12) United States Patent
Wani et al.

(10) Patent No.: US 12,242,080 B2
(45) Date of Patent: Mar. 4, 2025

(54) LASER PROCESSING DEVICE, AND LASER PROCESSING METHOD

(71) Applicant: HAMAMATSU PHOTONICS K.K., Hamamatsu (JP)

(72) Inventors: Yotaro Wani, Hamamatsu (JP); Yasunori Igasaki, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 222 days.

(21) Appl. No.: 17/779,300

(22) PCT Filed: Nov. 20, 2020

(86) PCT No.: PCT/JP2020/043465
§ 371 (c)(1),
(2) Date: May 24, 2022

(87) PCT Pub. No.: WO2021/106801
PCT Pub. Date: Jun. 3, 2021

(65) Prior Publication Data
US 2022/0390757 A1 Dec. 8, 2022

(30) Foreign Application Priority Data
Nov. 27, 2019 (JP) ................. 2019-214337

(51) Int. Cl.
*B23K 26/04* (2014.01)
*B23K 26/00* (2014.01)
(Continued)

(52) U.S. Cl.
CPC ........ *G02B 27/286* (2013.01); *B23K 26/0006* (2013.01); *B23K 26/046* (2013.01);
(Continued)

(58) Field of Classification Search
CPC .... B23K 26/006; B23K 26/04; B23K 26/046; B23K 26/10; B23K 26/53; B23K 2101/40;
(Continued)

(56) References Cited

U.S. PATENT DOCUMENTS

| 2001/0010699 A1 | 8/2001 | Cordingley et al. |
| 2008/0170143 A1* | 7/2008 | Yoshida ............ H01L 27/14645 348/294 |

(Continued)

FOREIGN PATENT DOCUMENTS

| JP | 2004157219 A * | 6/2004 | ............ G02B 27/28 |
| JP | 2008-177191 A | 7/2008 | |

(Continued)

OTHER PUBLICATIONS

Translation of JP 2004157219 A (published on Jun. 3, 2004).*
International Preliminary Report on Patentability mailed Jun. 9, 2022 for PCT/JP2020/043465.

*Primary Examiner* — Leo B Tentoni
(74) *Attorney, Agent, or Firm* — Faegre Drinker Biddle & Reath LLP

(57) ABSTRACT

There is provided a laser processing device that performs laser processing on an object made of a birefringent material, the device including: a light source that outputs laser light; a spatial light modulator that modulates the laser light output from the light source; a focusing lens that focuses the laser light toward the object; and a polarized light component control unit that is a function of the spatial light modulator to control polarized light components of the laser light such that the laser light is focused on one point in the object in a Z direction (optical axis direction).

3 Claims, 14 Drawing Sheets

(51) Int. Cl.
    *B23K 26/046* (2014.01)
    *B23K 26/10* (2006.01)
    *B23K 26/53* (2014.01)
    *G02B 5/30* (2006.01)
    *G02B 27/09* (2006.01)
    *G02B 27/28* (2006.01)
    *G02F 1/01* (2006.01)
    *H01L 21/304* (2006.01)
    *H01L 21/78* (2006.01)
    *B23K 101/40* (2006.01)
    *B23K 103/00* (2006.01)

(52) U.S. Cl.
    CPC ............ B23K 26/53 (2015.10); G02B 5/3025 (2013.01); G02B 27/0927 (2013.01); G02B 27/283 (2013.01); G02F 1/0136 (2013.01); *B23K 2101/40* (2018.08); *B23K 2103/56* (2018.08); *B29C 2791/009* (2013.01)

(58) Field of Classification Search
    CPC .......... B23K 2103/56; B29C 2791/009; G02B 5/3025; G02B 27/0927; G02B 27/283; G02B 27/286; G02F 1/0136; H01L 21/304; H01L 21/78
    USPC ............. 264/400, 482; 425/174; 219/121.67, 219/121.72, 121.73, 121.75; 359/301, 359/304, 489.08; 428/463; 438/463
    See application file for complete search history.

(56) References Cited

U.S. PATENT DOCUMENTS

2015/0343562 A1* 12/2015 Hirose ............... B23K 26/0006
    264/400 X
2016/0133776 A1* 5/2016 Kishi ...................... H01L 21/78
    257/428

FOREIGN PATENT DOCUMENTS

| | | |
|---|---|---|
| JP | 2011-248241 A | 12/2011 |
| JP | 2012-522384 A | 9/2012 |
| JP | 2013-238438 A | 11/2013 |
| JP | 2016-513024 A | 5/2016 |
| JP | 2017-057103 A | 3/2017 |
| JP | 2017-131947 A | 8/2017 |
| JP | 2017-183600 A | 10/2017 |
| JP | 2018-138310 A | 9/2018 |
| TW | 201502595 A | 1/2015 |
| TW | 201819083 A | 6/2018 |
| WO | WO-2010/111632 A2 | 9/2010 |
| WO | WO-2014/111385 A1 | 7/2014 |
| WO | WO-2014/156690 A1 | 10/2014 |
| WO | WO-2017/155104 A1 | 9/2017 |

\* cited by examiner

LASER PROCESSING DEVICE, AND LASER PROCESSING METHOD

TECHNICAL FIELD

The present invention relates to a laser processing device and a laser processing method.

BACKGROUND ART

A processing method has been known in which modified regions are formed inside a semiconductor object such as a semiconductor ingot by irradiating the semiconductor object with laser light, and semiconductor members such as semiconductor wafers are cut out from the semiconductor object by causing the growth of cracks extending from the modified regions (for example, refer to Patent Literatures 1 and 2).

CITATION LIST

Patent Literature

Patent Literature 1: Japanese Unexamined Patent Publication No. 2017-183600
Patent Literature 2: Japanese Unexamined Patent Publication No. 2017-057103

SUMMARY OF INVENTION

Technical Problem

Here, when laser light is focused in a semiconductor object made of a birefringent material, such as a gallium nitride (GAN) ingot, the refractive indexes of a P-polarized light component and an S-polarized light component of incident light are different from each other. In addition, the incident light is divided into a normal light ray and an abnormal light ray, and the abnormal light ray does not follow the Snell's law and propagates at a refraction angle different from that of the normal light ray. Therefore, the P-polarized light component and the S-polarized light component are focused at different positions in a depth direction of the semiconductor object. A focal point branches in the depth direction in such a manner, so that a plurality of dents are unintentionally formed in the semiconductor object, and inappropriate cracks are generated. Accordingly, for example, the quality of processing such as slicing decreases, which is a problem.

One aspect of the present invention is conceived in view of the above circumstances, and an object of the present invention is to improve the quality of laser processing of a semiconductor object made of a birefringent material.

Solution to Problem

According to one aspect of the present invention, there is provided a laser processing device that performs laser processing on a semiconductor object made of a birefringent material, by irradiating the semiconductor object with laser light, the device including: a laser output unit that outputs the laser light; a spatial light modulator that modulates the laser light output from the laser output unit; a focusing lens that focuses the laser light toward the semiconductor object; and a polarized light component control unit that controls polarized light components of the laser light such that the laser light is focused on one point in the semiconductor object in an optical axis direction.

In the laser processing device according to one aspect of the present invention, the laser light output from the laser output unit is modulated by the spatial light modulator, and is focused in the semiconductor object by the focusing lens. Then, in the laser processing device, the polarized light component control unit controls the polarized light components of the laser light such that the laser light is focused on one point in the semiconductor object. Normally, when the laser light is focused in the semiconductor object made of a birefringent material, the refractive indexes of a P-polarized light component and an S-polarized light component of incident light are different from each other. In addition, the incident light is divided into a normal light ray and an abnormal light ray, and the abnormal light ray does not follow the Snell's law and propagates at a refraction angle different from that of the normal light ray. Therefore, the P-polarized light component and the S-polarized light component are focused at different positions in a depth direction of the semiconductor object (two focal points are formed). As a result, a plurality of dents are unintentionally formed in the semiconductor object, so that inappropriate cracks are generated in the semiconductor object, and the quality of processing such as slicing decreases, which is a problem. In this regard, as in the laser processing device according to one aspect of the present invention, the polarized light component control unit controls the polarized light components of the laser light such that the laser light is focused on one point in the semiconductor object, so that only one focal point is formed and only one dent is formed in the semiconductor object. Therefore, it is possible to suppress the generation of unexpected (inappropriate) cracks in the semiconductor object. Accordingly, it is possible to suppress a decrease in the quality of processing such as slicing. As described above, in the laser processing device according to one aspect of the present invention, it is possible to improve the quality of laser processing of the semiconductor object made of a birefringent material.

In the laser processing device described above, the laser output unit may output the laser light that is linearly polarized light, and the polarized light component control unit may unify the polarized light components of the laser light which converges via the lens and with which the object is irradiated, to one of P-polarized light and S-polarized light. As described above, when the incident light includes the P-polarized light component and the S-polarized light component, the P-polarized light component and the S-polarized light component are focused at different positions, but the polarized light component control unit unifies the polarized light components of the laser light to one of the P-polarized light and the S-polarized light, so that one focal point can be appropriately formed.

In the laser processing device described above, the polarized light component control unit may include a conversion element that converts the linearly polarized light into radially polarized light or azimuthally polarized light. The radially polarized light is the P-polarized light, and is incident on the semiconductor object. In addition, the azimuthally polarized light is the S-polarized light, and is incident on the semiconductor object. For this reason, by converting the linearly polarized light into the radially polarized light or the azimuthally polarized light, it is possible to appropriately unify the polarized light components of the laser light to one of the P-polarized light and the S-polarized light, and it is possible to appropriately form one focal point.

In the laser processing device described above, the polarized light component control unit may include a slit portion that blocks the P-polarized light or the S-polarized light of the laser light. By blocking the P-polarized light or the S-polarized light, it is possible to appropriately unify the polarized light components of the laser light to one of the P-polarized light and the S-polarized light, and it is possible to appropriately form one focal point.

In the laser processing device described above, the slit portion may be a slit pattern to be set as a modulation pattern of the spatial light modulator. By setting the slit pattern as a modulation pattern of the spatial light modulator, with a simple configuration, it is possible to appropriately forming one focal point without providing a physical slit.

In the laser processing device described above, the birefringent material may be a uniaxial crystal material with a 001 plane orientation. Accordingly, when the polarized light components of the laser light are unified to one of the P-polarized light and the S-polarized light, it is possible to effectively improve the quality of laser processing.

According to one aspect of the present invention, there is provided a laser processing method in which laser processing is performed on a semiconductor object made of a birefringent material, by irradiating the semiconductor object with laser light, the method including: a step of placing the semiconductor object on a stage; a step of setting a polarized light component control unit that controls polarized light components of the laser light such that the laser light is focused on one point in the semiconductor object in an optical axis direction; and a step of outputting the laser light.

In the laser processing method described above, in the step of outputting the laser light, the laser light that is linearly polarized light may be output, and in the step of setting the polarized light component control unit, a conversion element that converts the linearly polarized light into radially polarized light or azimuthally polarized light may be attached.

In the laser processing method described above, in the step of setting the polarized light component control unit, a slit pattern that blocks P-polarized light or S-polarized light of the laser light may be set as a modulation pattern of a spatial light modulator that modulates the laser light.

Advantageous Effects of Invention

According to one aspect of the present invention, it is possible to improve the quality of laser processing of the semiconductor object made of a birefringent material.

DESCRIPTION OF EMBODIMENTS

Figure 1:
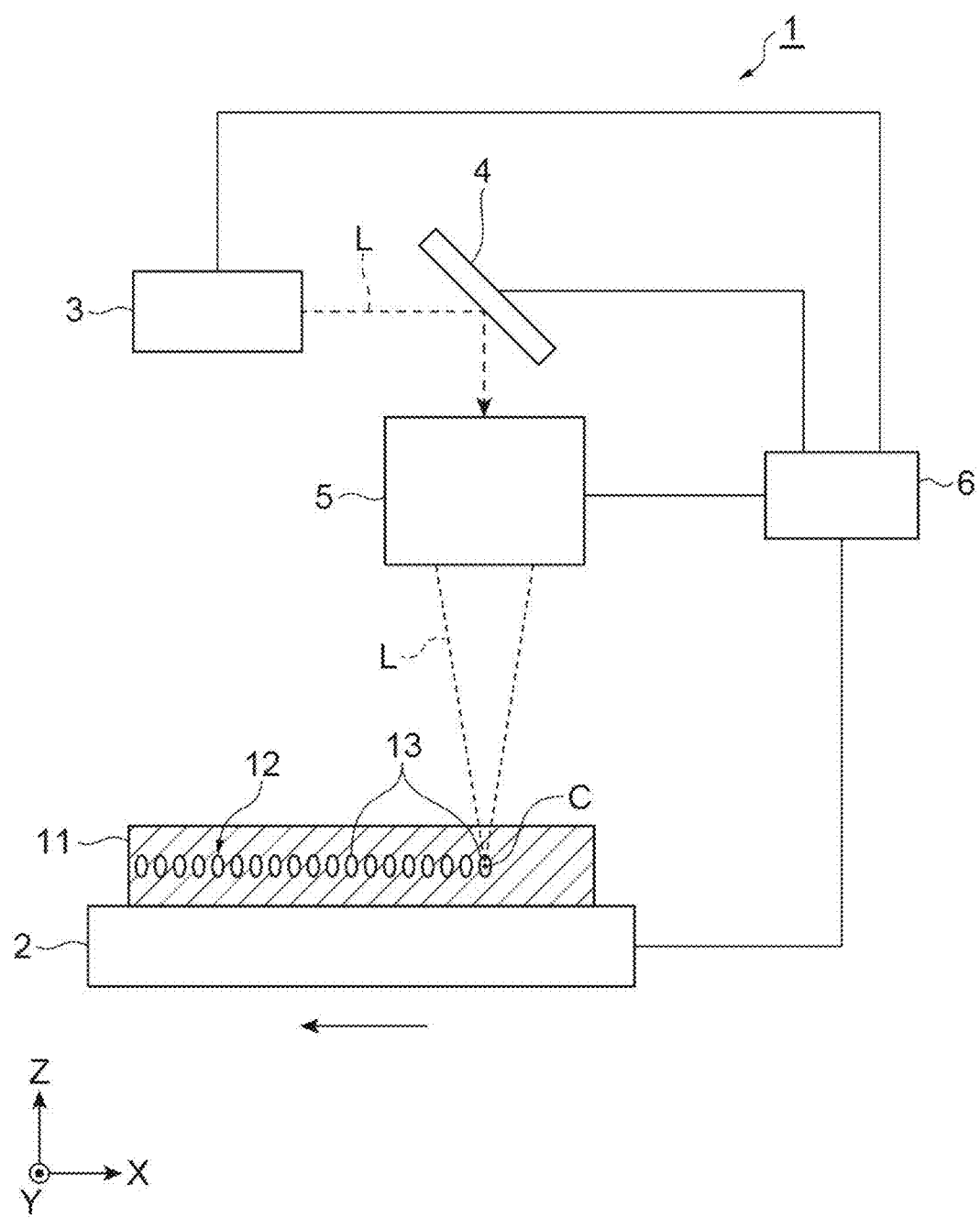
FIG. 1 is a configuration view of a laser processing device according to a first embodiment of the present invention.

Hereinafter, embodiments of the present invention will be described in detail with reference to the drawings. Incidentally, in the drawings, the same or equivalent portions are denoted by the same reference signs, and duplicated descriptions will be omitted.

First Embodiment

[Basic Configuration of Laser Processing Device]

As illustrated in FIG. 1, a laser processing device 1 according to a first embodiment includes a stage 2, a light source 3, a spatial light modulator 4, a focusing lens 5, and a control unit 6. The laser processing device 1 is a device that performs laser processing on an object 11 that is a semiconductor object made of a birefringent material, by irradiating the object 11 with the laser light L. The birefringent material is, for example, a uniaxial crystal material with a (001) plane orientation which has anisotropy. The birefringent material may be a biaxial crystal material. The laser processing device 1 irradiates the object 11 with the laser light L to form a modified region 12 in the object 11. The laser processing device 1 may be a laser slicing device to be mainly described in the present embodiment, and may be a laser dicing device, an internal laser marking device, or a laser structure device. Hereinafter, a first horizontal direction is referred to as an X direction, and a second horizontal direction perpendicular to the first horizontal direction is referred to as a Y direction. In addition, a vertical direction is referred to as a Z direction.

For example, the stage 2 supports the object 11 by suctioning a film attached to the object 11. In the present embodiment, the stage 2 is movable in each of the X direction and the Y direction. In addition, the stage 2 is rotatable around a center axis that is an axis parallel to the Z direction.

The light source 3 is a laser output unit that outputs the laser light L that is transmittable through the object 11, via a pulse oscillation method. The light source 3 outputs the laser light L that is, for example, linearly polarized light. An output of the laser light L output from the light source 3 is adjusted by, for example, an attenuator (not illustrated), and the beam diameter of the laser light L is increased by one or a plurality of lens systems (not illustrated). The spatial light modulator 4 modulates the laser light L output from the light source 3. The spatial light modulator 4 is, for example, a liquid crystal on silicon (LCOS)-spatial light modulator (SLM). In the present embodiment, the spatial light modulator 4 also functions as a polarized light component control unit (details will be described later) that controls polarized light components of the laser light L. The focusing lens 5 focuses the laser light L modulated by the spatial light modulator 4, toward the object 11. In the present embodiment, the spatial light modulator 4 and the focusing lens 5 are movable along the Z direction.

When the laser light L is focused inside the object 11 supported by the stage 2, the laser light L is absorbed particularly at a portion corresponding to a focal point C of the laser light L, and the modified region 12 is formed inside the object 11. The modified region 12 is a region of which the density, the refractive index, the mechanical strength, and other physical characteristics are different from those of a non-modified region. Examples of the modified region 12 include a melting region, a crack region, a dielectric breakdown region, a refractive index change region, and the like.

As one example, when the stage 2 is moved along the X direction and the focal point C is moved relative to the object 11 along the X direction, a plurality of modified spots 13 are formed to be arranged in one row along the X direction. One modified spot 13 is formed by irradiation with the laser light L of one pulse. The modified region 12 in one row is a set of a plurality of the modified spots 13 arranged in one row. The modified spots 13 adjacent to each other may be connected to each other or may be separated from each other depending on a relative movement speed of the focal point C with respect to the object 11 and a repetition frequency of the laser light L.

The control unit 6 controls the stage 2, the light source 3, the spatial light modulator 4, and the focusing lens 5. The control unit 6 is configured as a computer device including a processor, a memory, a storage, a communication device, and the like. In the control unit 6, software (program) read into the memory or the like is executed by the processor, the reading and writing of data from and to the memory and the storage and communication by the communication device are controlled by the processor. Accordingly, the control unit 6 realizes the various functions.

Figure 2:
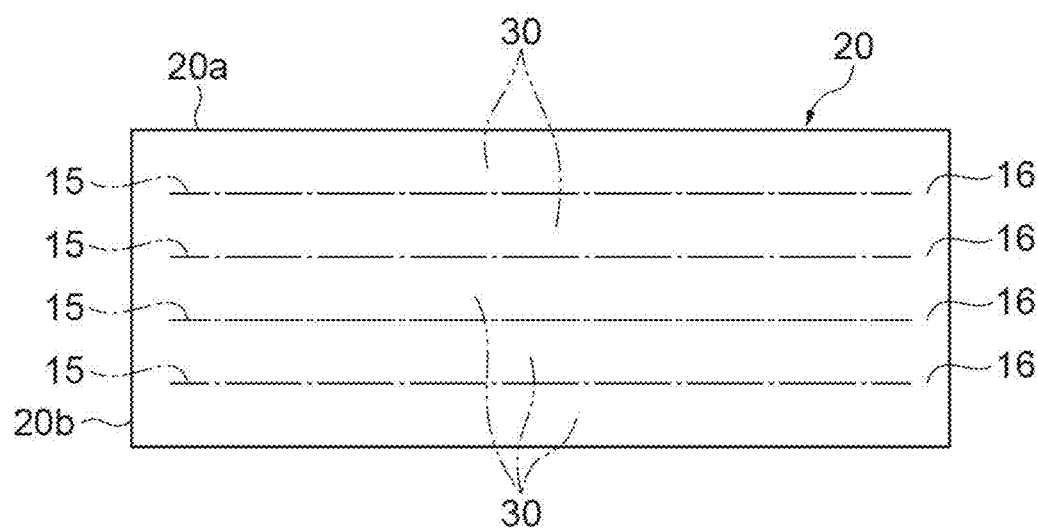
FIG. 2 is a side view of a GaN ingot that is an object of a laser processing method and of a semiconductor member manufacturing method of the first embodiment.
Figure 3:
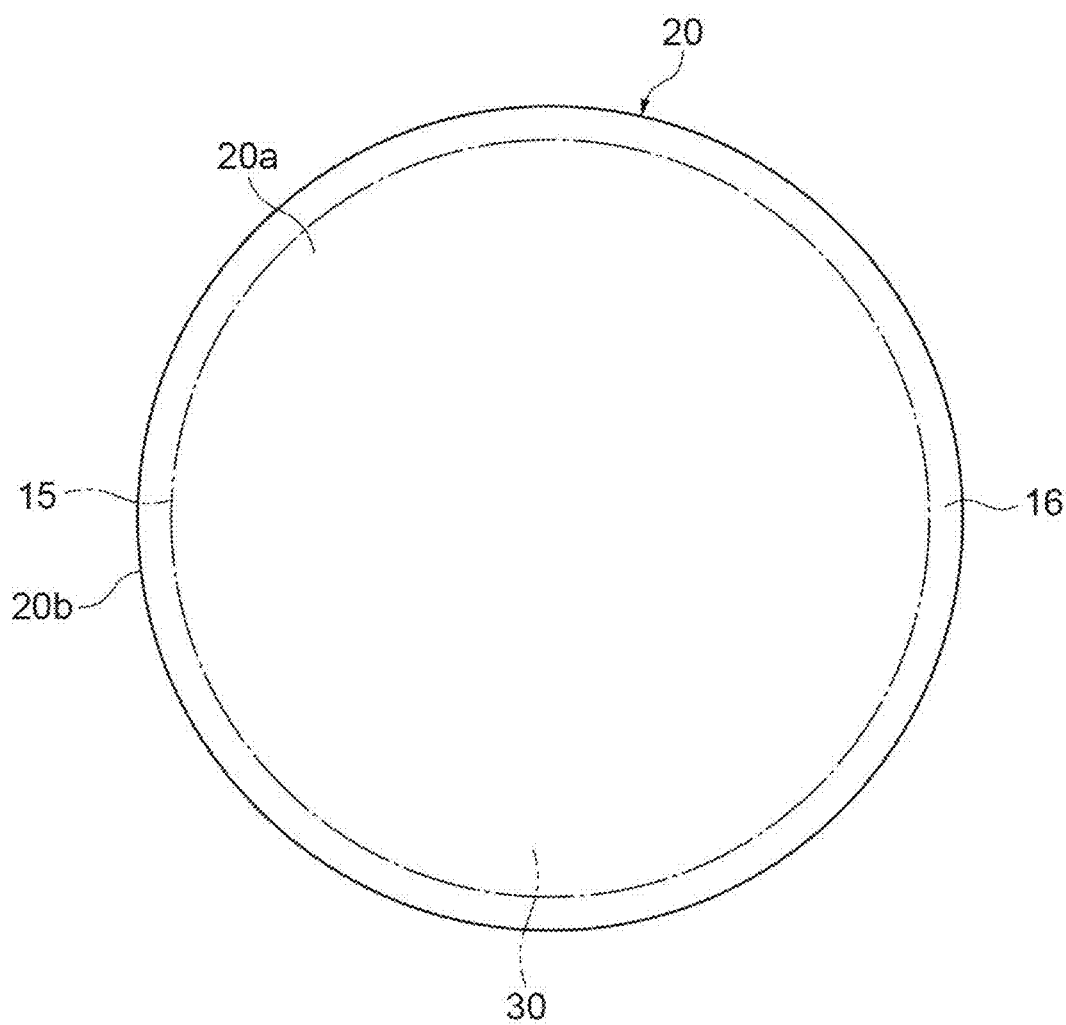
FIG. 3 is a plan view of the GaN ingot illustrated in FIG. 2.

One Example of Semiconductor Member Manufacturing Method Using Laser Processing Device Next, as one example of a semiconductor member manufacturing method using the laser processing device 1, a step of acquiring a plurality of GaN wafers 30 (refer to FIGS. 2 and 3) by slicing a GaN ingot 20 (refer to FIGS. 2 and 3) that is the object 11 will be described. In the present embodiment, as illustrated in FIGS. 2 and 3, the object 11 is the GaN ingot (semiconductor ingot or semiconductor object) 20 that is formed in, for example, a disk shape from gallium nitride (GaN). As one example, the diameter of the GaN ingot 20 is 2 inches, and the thickness of the GaN ingot 20 is 2 mm. As one example, the diameter of the GaN wafer 30 is 2 inches, and the thickness of the GaN wafer 30 is 100 μm.

First, the laser processing device 1 described above forms a plurality of the modified spots 13 along a plurality of virtual planes 15. The plurality of virtual planes 15 each are planes facing a surface 20a of the GaN ingot 20 inside the GaN ingot 20, and are set to be arranged in a direction facing the surface 20a. In the present embodiment, each of the plurality of virtual planes 15 is a plane parallel to the surface 20a, and has, for example, a circular shape. The plurality of virtual planes 15 are set to overlap each other when viewed from a surface 20a side. In the GaN ingot 20, a plurality of peripheral regions 16 are set to surround the plurality of virtual planes 15. Namely, each of the plurality of virtual planes 15 does not reach a side surface 20b of the GaN ingot 20. As one example, a distance between the virtual planes 15 adjacent to each other is 100 μm, and the width of the peripheral region 16 (in the present embodiment, a distance between an outer edge of the virtual plane 15 and the side surface 20b) is 30 μm or more.

The formation of the plurality of modified spots 13 is carried out by sequentially irradiating the virtual planes 15 with the laser light L having, for example, a wavelength of 532 nm one by one from a side opposite the surface 20a. Since the plurality of modified spots 13 are formed in the plurality of virtual planes 15 in the same manner, respectively, hereinafter, the formation of the plurality of modified spots 13 along the virtual plane 15 closest to the surface 20a will be described with reference to FIGS. 4 and 5. Incidentally, in FIG. 5, each arrow indicates a trajectory of the focal point C of the laser light L.

Figure 4:
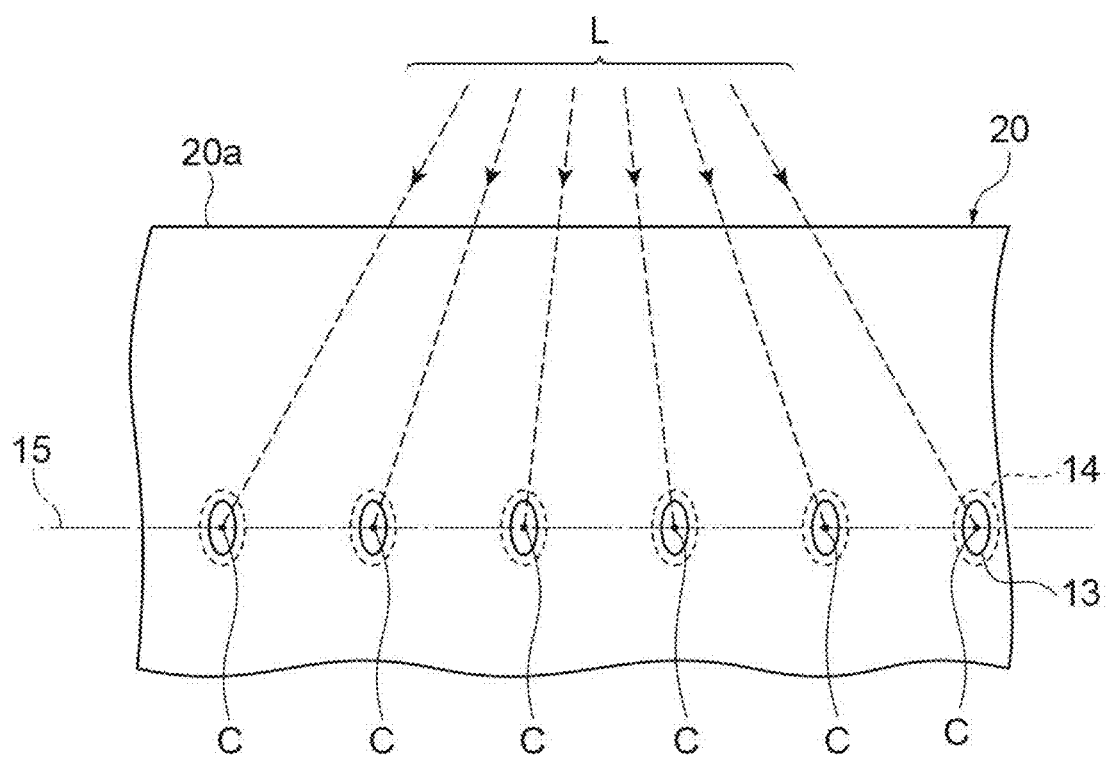
FIG. 4 is a partial vertical cross-sectional view of the GaN ingot in one step of the semiconductor member manufacturing method using the laser processing device.
Figure 5:
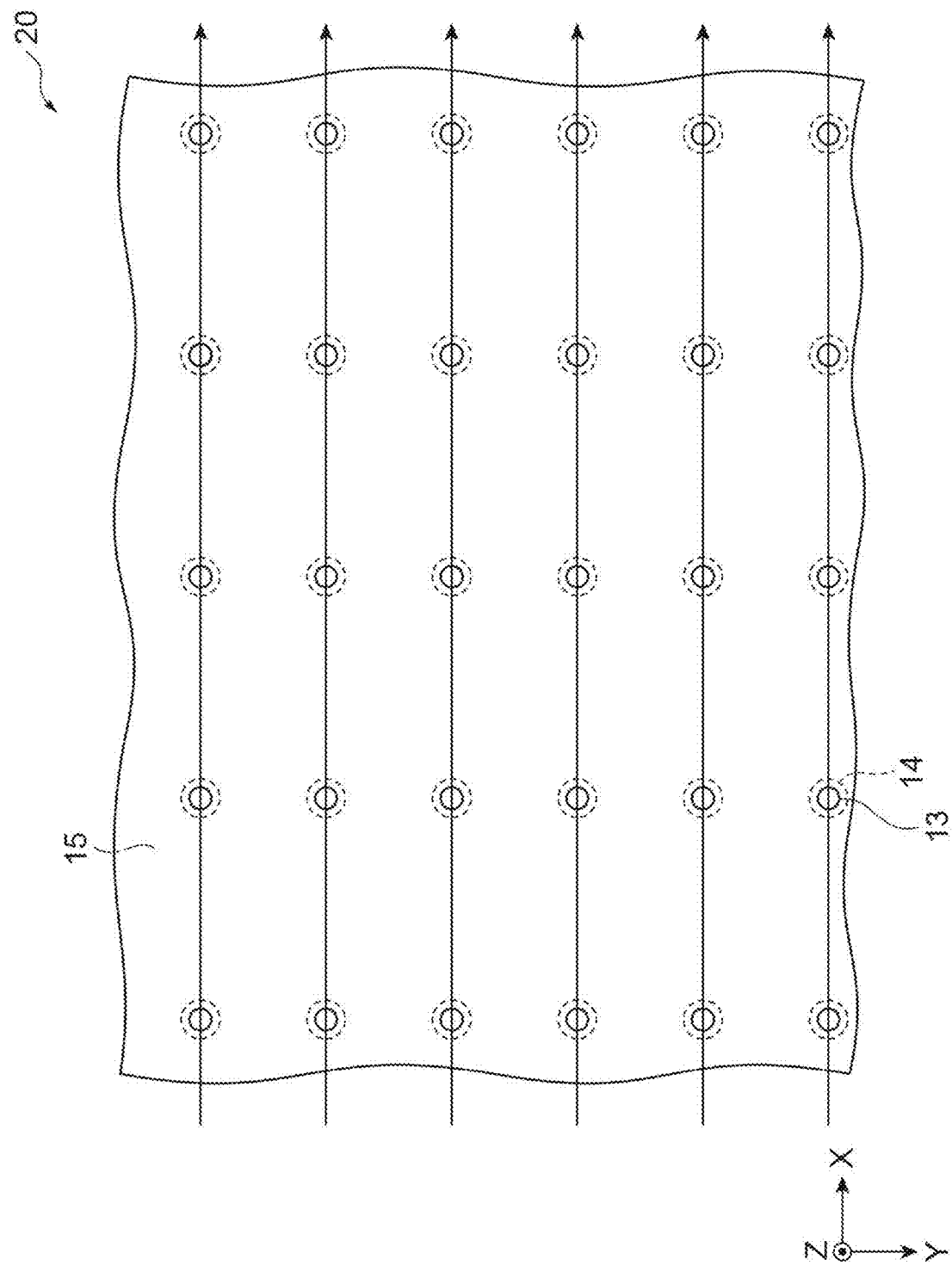
FIG. 5 is a partial horizontal cross-sectional view of the GaN ingot in one step of the semiconductor member manufacturing method using the laser processing device.

First, as illustrated in FIGS. 4 and 5, the laser processing device 1 forms the plurality of modified spots 13 along the virtual plane 15 (for example, to be two-dimensionally arranged along the entirety of the virtual plane 15) by causing the laser light L to be incident on the inside of the GaN ingot 20 from the surface 20a. At this time, the laser processing device 1 may form the plurality of modified spots 13 such that a plurality of cracks 14 extending from the plurality of modified spots 13 are not connected to each other, or may the plurality of modified spots 13 such that the plurality of cracks 14 are connected to each other. In addition, the laser processing device 1 forms a plurality of rows of the modified spots 13 by moving the focal points C of the laser light L that is pulse oscillated, along the virtual plane 15. Incidentally, in FIGS. 4 and 5, the modified spot 13 is illustrated by a blank circle (without hatching), and a range where the crack 14 extends is illustrated by a broken line.

In the present embodiment, the laser light L that is pulse oscillated is modulated by the spatial light modulator 4 to be focused on a plurality of the focal points C arranged in the Y direction. Then, the plurality of focal points C are moved on the virtual plane 15 along the X direction relative to the virtual plane 15. As one example, the pulse pitch of the laser light L (namely, a value obtained by dividing a relative movement speed of the plurality of focal points C by the repetition frequency of the laser light L) is 10 μm. In addition, the pulse energy of the laser light L per one focal point C (hereinafter, simply referred to as "pulse energy of the laser light L") is 0.33 μJ.

Figure 6:
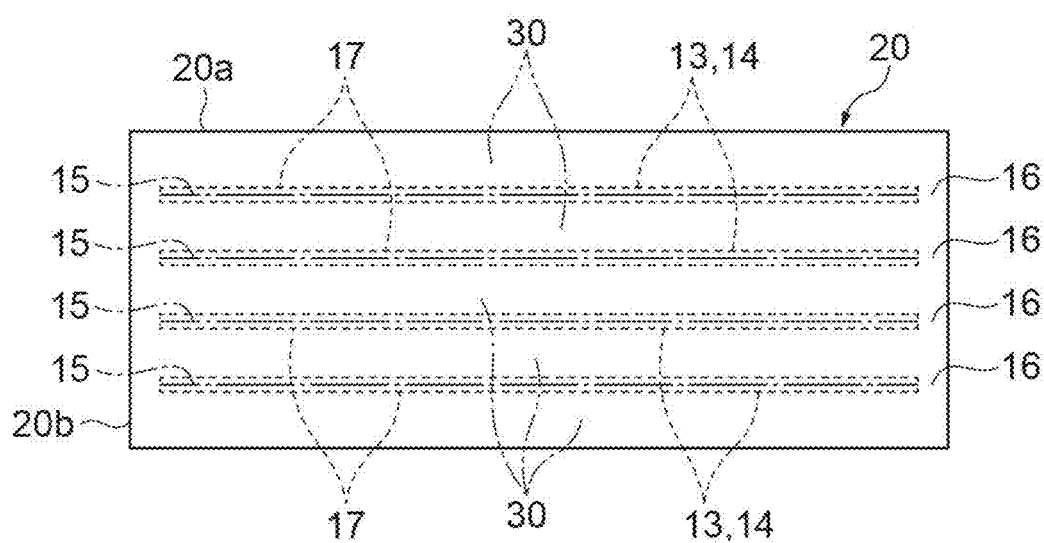
FIG. 6 is a side view of the GaN ingot in one step of the semiconductor member manufacturing method using the laser processing device.

Subsequently, a heating device including a heater and the like heats the GaN ingot 20 to cause the plurality of cracks 14 extending from the plurality of modified spots 13, to be connected to each other in the plurality of virtual planes 15, so that a crack 17 extending over the virtual plane 15 (hereinafter, simply referred to as the "crack 17") is formed in each of the plurality of virtual planes 15 as illustrated in FIG. 6. In FIG. 6, a range where the plurality of modified spots 13, the plurality of cracks 14, and the crack 17 are formed is illustrated by broken lines. Incidentally, the plurality of cracks 14 may be connected to each other to form the crack 17 by applying any force to the GaN ingot 20 via a method other than heating. In addition, the plurality of cracks 14 may be connected to each other to form the crack 17 by forming the plurality of modified spots 13 along the virtual plane 15.

Here, in the GaN ingot 20, nitrogen gas is generated inside the plurality of cracks 14 extending from the plurality of modified spots 13. For this reason, the GaN ingot 20 is heated to cause the nitrogen gas to expand, so that the crack 17 can be formed using the pressure (internal pressure) of the nitrogen gas. However, since the peripheral region 16 prevents the growth of the plurality of cracks 14 to the outside of the virtual plane 15 (for example, the side surface 20b of the GaN ingot 20) surrounded by the peripheral region 16, it is possible to suppress the escape of the nitrogen gas generated inside the plurality of cracks 14 to the outside of the virtual plane 15. Namely, the peripheral region 16 is a non-modified region that does not include the modified spot 13, and is a region that prevents the growth of the plurality of cracks 14 to the outside of the virtual plane 15 surrounded by the peripheral region 16, when the crack 17 is formed in the virtual plane 15 surrounded by the peripheral region 16. For this reason, the width of the peripheral region 16 may be 30 μm or more.

Figure 7:
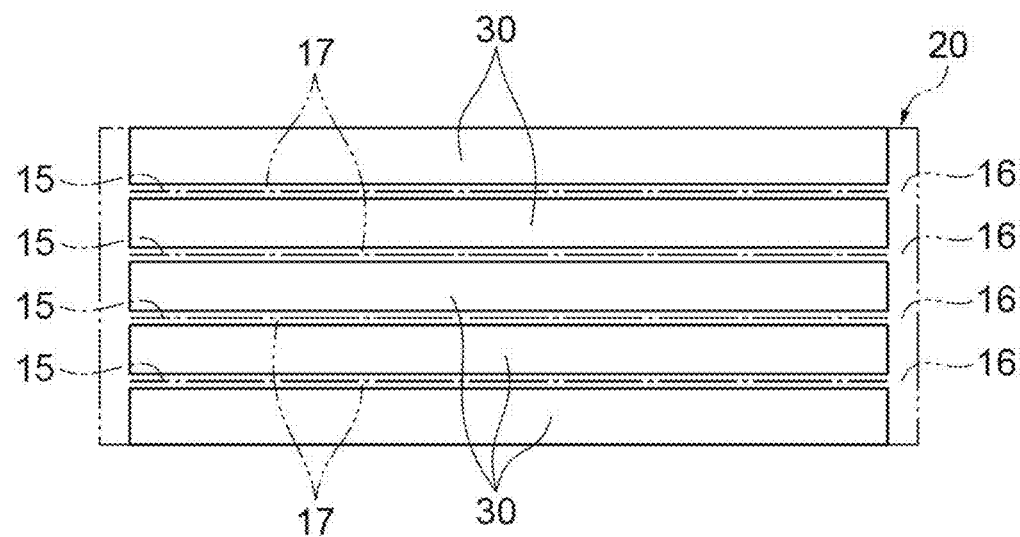
FIG. 7 is a side view of the GaN ingot in one step of the semiconductor member manufacturing method using the laser processing device.

Subsequently, as illustrated in FIG. 7, a grinding device grinds (polishes) portions corresponding to the plurality of peripheral regions 16 and to the plurality of virtual planes 15 in the GaN ingot 20, to acquire the plurality of GaN wafers 30 from the GaN ingot 20 with each of a plurality of the cracks 17 as a boundary. In such a manner, the GaN ingot 20 is cut along each of the plurality of virtual planes 15. Incidentally, in this step, the portions corresponding to the plurality of peripheral regions 16 in the GaN ingot 20 may be removed by machining other than grinding, laser processing, or the like.

[Configuration of Laser Processing Device According to Polarized Light Component Control]

The spatial light modulator 4 functions as a polarized light component control unit that controls polarized light components of the laser light L such that the laser light L is focused on one point in the object 11 in an optical axis direction (Z direction and a depth direction of the object 11). Normally, when the laser light is focused in the object 11 made of a birefringent material, such as the GaN ingot 20, since the refractive indexes of a P-polarized light (abnormal light ray) component and an S-polarized light (normal light ray) component of incident light are different from each other, and the normal light ray and the abnormal light ray propagate at different refraction angles, the P-polarized light component and the S-polarized light component are focused at different positions in the Z direction of the object 11, and two focal points FP are formed (refer to FIG. 11(a)). As a result, a plurality of dents are formed in the object 11 to generate inappropriate cracks, and the quality of the above-described processing such as the slicing of the GaN wafer 30 decreases, which is a problem. In the present embodiment, the spatial light modulator 4 functions as a polarized light component control unit to control polarized light components of the laser light L such that only one focal point FP is formed in the Z direction of the object 11 (refer to FIG. 11(b)).

The spatial light modulator 4 functions as a slit portion that blocks P-polarized light or S-polarized light of the laser light L, so that polarized light components of the laser light L are unified to one of the P-polarized light and the S-polarized light, and one focal point FP is formed. Incidentally, "unifying the polarized light components of the laser light L to one of the P-polarized light and the S-polarized light" includes not only a case where the polarized light components of the laser light L are completely limited to one of the P-polarized light and the S-polarized light, but also a case where polarized light components to be blocked are included in the polarized light components of the laser light L within a range where the number of the focal points FP is not 2 or more. The slit portion as a function of the spatial light modulator 4 is a slit pattern to be set as a modulation pattern of the spatial light modulator 4. In the spatial light modulator 4, the modulation pattern to be displayed on a liquid crystal layer can be appropriately set to modulate the laser light L (for example, the intensity, amplitude, phase, polarization, or the like of the laser light L is modulated). The modulation pattern is a hologram pattern that provides modulation to the laser light L, and includes a slit pattern.

Figure 8:
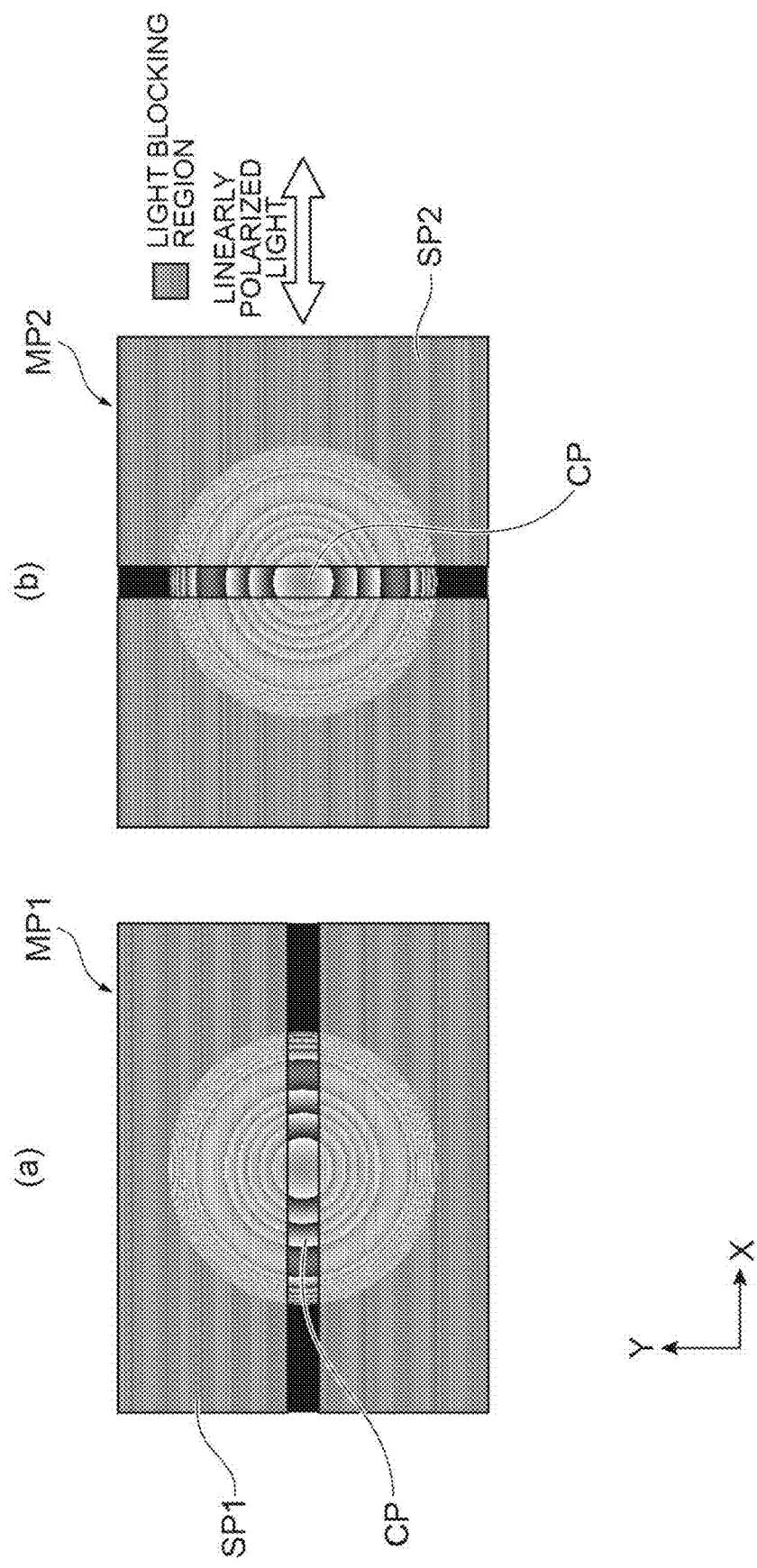
FIG. 8 shows pictures illustrating modulation patterns (including a slit pattern) of a spatial light modulator.

FIG. 8 shows pictures illustrating modulation patterns (including a slit pattern) to be displayed on the liquid crystal layer of the spatial light modulator 4. A "light blocking region" illustrated in FIG. 8 indicates a region where light is blocked by a slit pattern SP1 or a slit pattern SP2 to be described later. In addition, an arrow of linearly polarized light illustrated in FIG. 8 indicates a linearly polarized light direction. A modulation pattern MP1 illustrated in FIG. 8(a) includes the slit pattern SP1 and an aberration correction pattern CP. The aberration correction pattern is a correction pattern such as spherical aberration, astigmatism aberration, distortion aberration, coma aberration, or the like. In the example illustrated in FIG. 8(a), the slit pattern SP1 is set such that light at portions other than a slit portion formed in the linearly polarized light direction is blocked. In this case, S-polarized light of the laser light L is blocked, and polarized light components of the laser light L are unified (limited) to P-polarized light. In addition, a modulation pattern MP2 illustrated in FIG. 8(b) includes the slit pattern SP2 and the aberration correction pattern CP. In the example illustrated in FIG. 8(b), the slit pattern SP2 is set such that light at portions other than a slit portion formed in a direction orthogonal to the linearly polarized light direction is blocked. In this case, P-polarized light of the laser light is blocked, and polarized light components of the laser light L is unified (limited) to S-polarized light.

Figure 9:
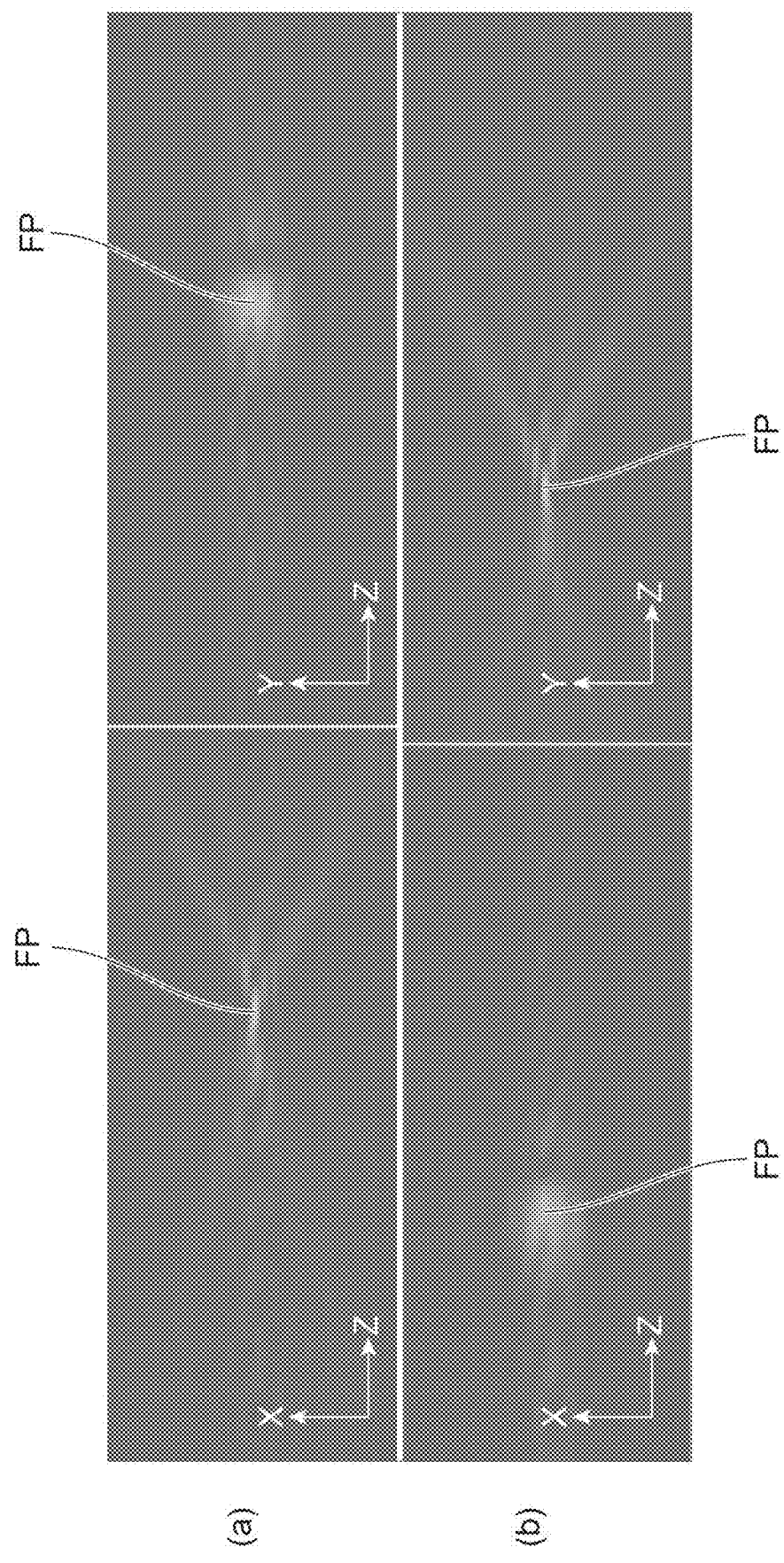
FIG. 9 shows pictures illustrating focal points when slit patterns are used.

FIG. 9(a) shows pictures illustrating the focal point FP when the slit pattern SP1 is used. FIG. 9(b) shows pictures illustrating the focal point FP when the slit pattern SP2 is used. In each of FIGS. 9(a) and 9(b), the left drawing illustrates an X-Z plane, and the right drawing illustrates a Y-Z plane. As illustrated in FIG. 9(a), when the slit pattern SP1 is used, it is possible to confirm that only one focal point FP is formed in the Z direction (optical axis direction) regardless of whether the X-Z plane or the Y-Z plane is referred to. Similarly, as illustrated in FIG. 9(b), when the slit pattern SP2 is used, it is possible to confirm that only one focal point FP is formed in the Z direction (optical axis direction) regardless of whether the X-Z plane or the Y-Z plane is referred to. Incidentally, when the slit pattern SP2 is used, P-polarized light is blocked and polarized light components are unified to an S-polarized light component; meanwhile since S-polarized light has a uniform refractive index regardless of the incident angle, the focability can be improved.

One Example of Laser Processing Method

Figure 10:
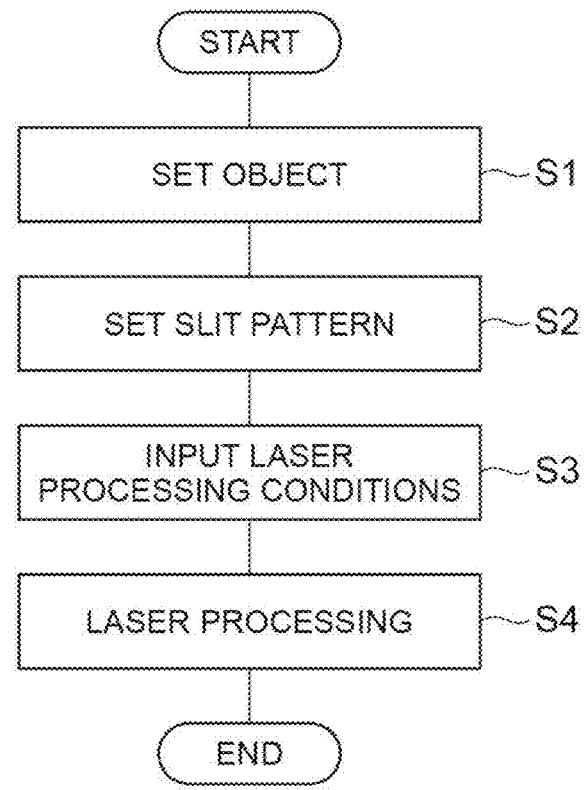
FIG. 10 is a flowchart illustrating each step of the laser processing method according to the first embodiment.

Next, one example of a laser processing method will be described with reference to FIG. 10. FIG. 10 is a flowchart illustrating each step of a laser processing method according to the first embodiment. In this laser processing method, laser processing is performed on the object 11 by irradiating the object 11 made of a birefringent material (for example, the GaN ingot 20) with the laser light L.

As illustrated in FIG. 10, in the laser processing method according to the first embodiment, first, the object 11 is set (placed) on the stage 2 (step S1 and a step of placing a semiconductor object).

Subsequently, in the spatial light modulator 4, a modulation pattern (including a slit pattern) to be displayed on the liquid crystal layer is set (step S2 and a step of setting a polarized light component control unit). The modulation pattern referred to here is, for example, the modulation pattern MP1 illustrated in FIG. 8(a), and includes the slit pattern SP1 that blocks S-polarized light of the laser light L and that unifies (limits) polarized light components to P-polarized light. Alternatively, the modulation pattern is, for example, the modulation pattern MP2 illustrated in FIG. 8(b), and includes the slit pattern SP2 that blocks P-polarized light of the laser light L and that unifies (limits) polarized light components to S-polarized light. In such a manner, in step S2 (step of setting a polarized light component control unit), the slit pattern SP1 or the slit pattern SP2 that blocks the P-polarized light or the S-polarized light of the laser light L is set as a modulation pattern of the spatial light modulator 4. Incidentally, a slit pattern and an aberration correction pattern may be displayed on the liquid crystal layer of the spatial light modulator 4.

Subsequently, laser processing conditions are input and set (step S3). The laser processing conditions are, for example, conditions such as the energy, the pulse pitch, and the like of the laser light L. Finally, the laser processing device 1 forms the plurality of modified spots 13 along the plurality of virtual planes 15, and carries out laser processing (step S4 and a step of outputting laser light).

[Actions and Effects]

Next, actions and effects of the laser processing device 1 according to the present embodiment will be described.

The laser processing device 1 according to the present embodiment is a laser processing device that performs laser processing on the object 11 made of a birefringent material, the laser processing device including: the light source 3 that outputs the laser light L; the spatial light modulator 4 that modulates the laser light L output from the light source 3; the focusing lens 5 that focuses the laser light L toward the object 11; and the polarized light component control unit that is a function of the spatial light modulator 4 to control polarized light components of the laser light L such that the laser light L is focused on one point in the object 11 in the Z direction (optical axis direction).

Figure 11:
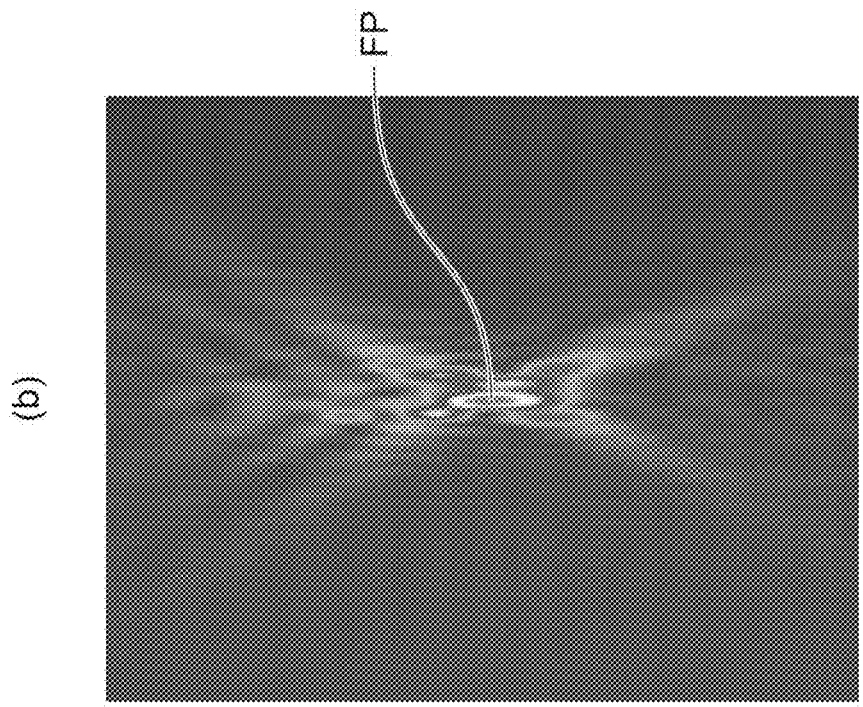
FIG. 11 shows pictures illustrating a difference between focal points of a comparative example and the present embodiment.
Figure 11:
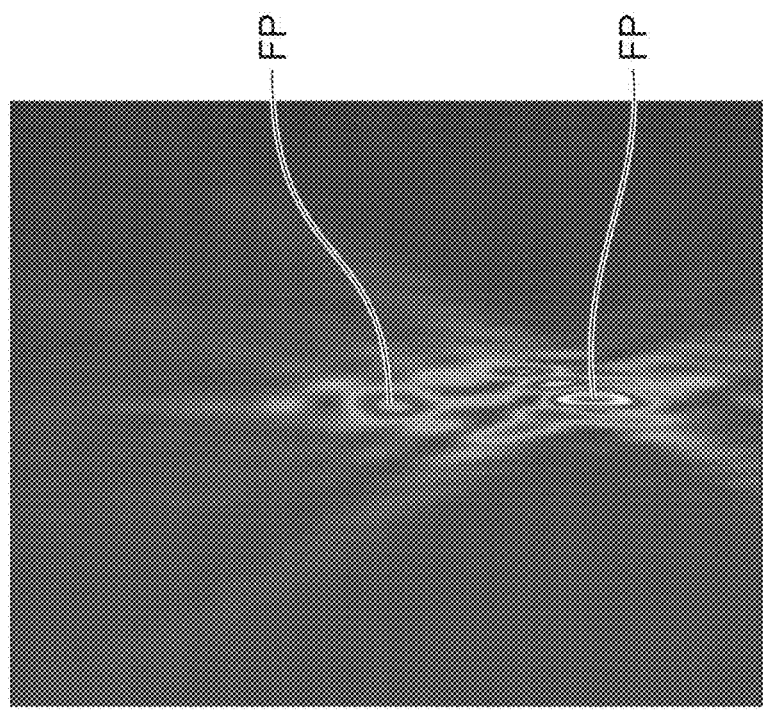
Figure 11:
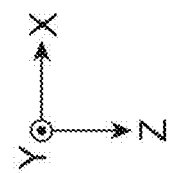

In the laser processing device 1 according to the present embodiment, the laser light output from the light source 3 is modulated by the spatial light modulator 4, and is focused in the object 11 by the focusing lens 5. Then, in the laser processing device 1, the polarized light component control unit that is a function of the spatial light modulator 4 controls polarized light components of the laser light L such that the laser light L is focused on one point in the object 11. Normally, when laser light is focused in a semiconductor object made of a birefringent material, since the refractive indexes of a P-polarized light component and an S-polarized light component of incident light are different from each other, as illustrated in FIG. 11(a), the P-polarized light component and the S-polarized light component are focused at different positions in a depth direction of the semiconductor object (two focal points FP are formed). As a result, a plurality of dents are unintentionally formed in the semiconductor object, so that inappropriate cracks are generated in the semiconductor object, and the quality of processing such as slicing decreases, which is a problem. In this regard, as in the laser processing device 1 according to the present embodiment, the polarized light component control unit that is a function of the spatial light modulator 4 controls polarized light components of the laser light such that one focal point FP is formed in the object 11 (refer to FIG. 11(b)), so that only one dent is formed in the object 11. Therefore, it is possible to suppress the generation of unexpected (inappropriate) cracks in the object 11. Accordingly, it is possible to suppress a decrease in the quality of processing such as slicing. As described above, in the laser processing device 1 according to the present embodiment, it is possible to improve the quality of laser processing of the semiconductor object made of a birefringent material.

In the laser processing device 1, the light source 3 outputs the laser light L that is a linearly polarized light, and the polarized light component control unit that is a function of the spatial light modulator 4 unifies polarized light components of the laser light L to one of P-polarized light and S-polarized light. As described above, when incident light includes a P-polarized light component and an S-polarized light component, the P-polarized light component and the S-polarized light component are focused at different positions, but the polarized light component control unit unifies polarized light components of the laser light L to one of P-polarized light and S-polarized light, so that one focal point FP can be appropriately formed.

In the laser processing device 1, the polarized light component control unit that is a function of the spatial light modulator 4 may include a slit portion that blocks P-polarized light or S-polarized light of the laser light. By blocking the P-polarized light or the S-polarized light, it is possible to appropriately unify the polarized light components of the laser light to one of the P-polarized light and the S-polarized light, and it is possible to appropriately form one focal point.

In the laser processing device 1, the above-described slit portion may be the slit pattern SP1 or the slit pattern SP2 (refer to FIG. 8) to be set as a modulation pattern of the spatial light modulator 4. By setting the slit pattern as a modulation pattern of the spatial light modulator 4, with a minimum simple configuration, it is possible to appropriately forming one focal point without providing a physical slit. Incidentally, in the laser processing device 1, instead of the slit pattern of the spatial light modulator 4, a physical slit may be provided to block P-polarized light or S-polarized light of the laser light.

Second Embodiment

Hereinafter, a laser processing device 100 and a laser processing method according to a second embodiment of the present invention will be described with reference to FIGS. 12 to 14. Incidentally, hereinafter, points that are different from the first embodiment will be mainly described, and duplicated description of the first embodiment will be omitted.

Figure 12:
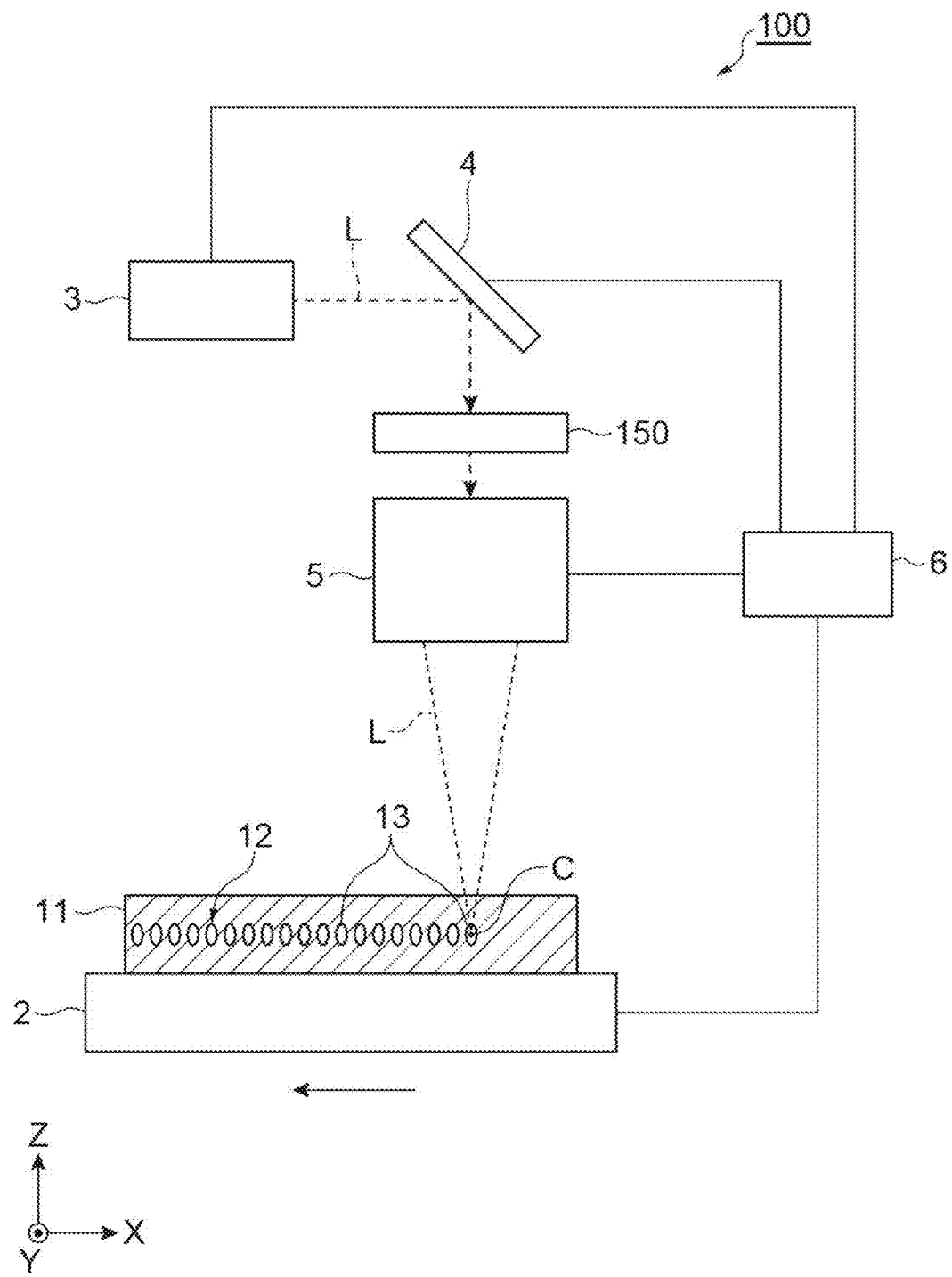
FIG. 12 is a configuration view of a laser processing device according to a second embodiment of the present invention.

FIG. 12 is a configuration view of the laser processing device 100 according to the second embodiment. The laser processing device 100 has substantially the same basic configuration as that of the laser processing device 1 according to the first embodiment, but includes an axisymmetric polarizing element 150 (conversion element) in addition to the configuration of the laser processing device 1.

As illustrated in FIG. 12, the axisymmetric polarizing element 150 is disposed on an optical path, specifically, downstream of the spatial light modulator 4 and upstream of the focusing lens 5. Since linearly polarized light needs to be input to the spatial light modulator 4, the axisymmetric polarizing element 150 needs to be disposed downstream of the spatial light modulator 4. The axisymmetric polarizing element 150 is configured to function as a polarized light component control unit, and is a conversion element (polarization converter) that converts linearly polarized light of the laser light L into radially polarized light and azimuthally polarized light (concentrically polarized light).

Figure 13:
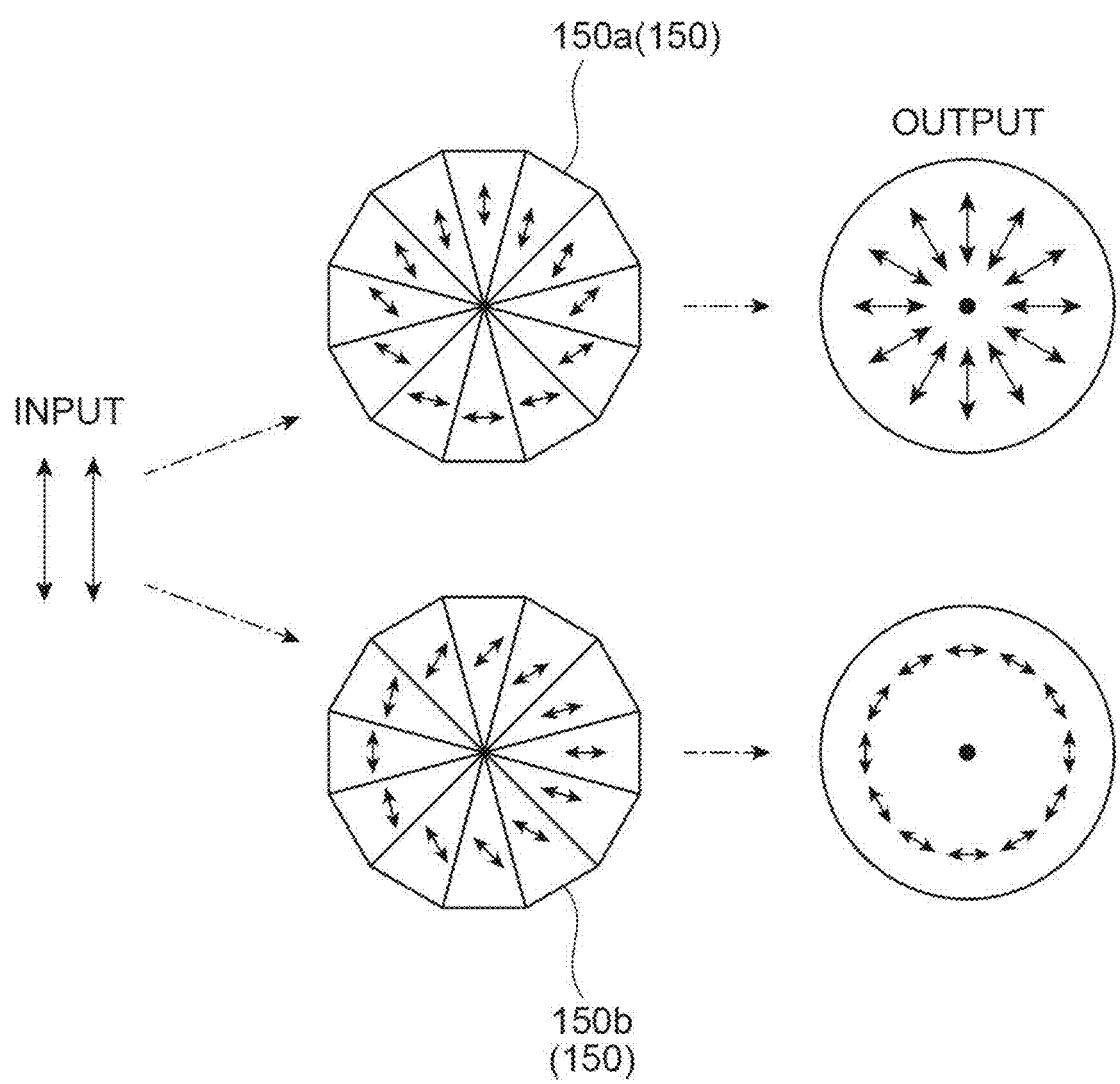
FIG. 13 illustrates views describing modulation of polarized light distributions by an axisymmetric polarizing element.

FIG. 13 illustrates views describing modulation of polarized light distributions by the axisymmetric polarizing element 150. In FIG. 13, as an example of the axisymmetric polarizing element 150, an axisymmetric polarizing element 150a and an axisymmetric polarizing element 150b are illustrated. The axisymmetric polarizing element 150a is a conversion element that converts linearly polarized light (INPUT illustrated in FIG. 13) of the laser light L into radially polarized light (upper drawing of OUTPUT illustrated in FIG. 13). The axisymmetric polarizing element 150b is a conversion element that converts linearly polarized light (INPUT illustrated in FIG. 13) of the laser light L into azimuthally polarized light (lower drawing of OUTPUT illustrated in FIG. 13). As the axisymmetric polarizing element 150, a known configuration in the related art can be used, and for example, a member can be used in which a ½ waveplate in which the axis azimuth varies by 15 degrees is provided on one quartz plate. Switching between conversion to radially polarized light and conversion to azimuthally polarized light can be performed by rotating the axisymmetric polarizing element 150 by 90 degrees.

One example of a laser processing method using the laser processing device 100 described above will be described with reference to FIG. 14. FIG. 14 is a flowchart illustrating each step of a laser processing method according to the second embodiment.

Figure 14:
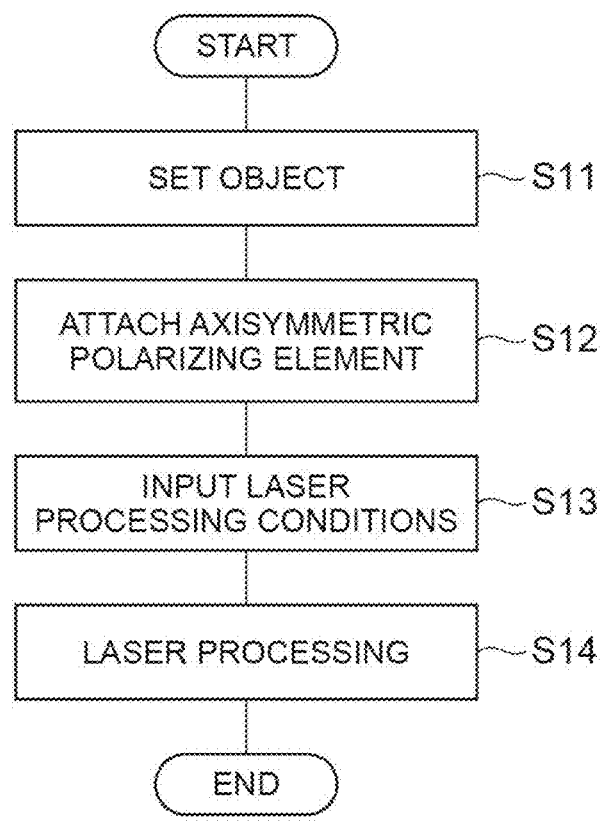
FIG. 14 is a flowchart illustrating each step of a laser processing method according to the second embodiment.

As illustrated in FIG. 14, in the laser processing method according to the second embodiment, first, the object 11 is set (placed) on the stage 2 (step S11 and a step of placing a semiconductor object).

Subsequently, the axisymmetric polarizing element 150 that converts linearly polarized light into radially polarized light or azimuthally polarized light is attached at a predetermined position on the optical path (downstream of the spatial light modulator 4 and upstream of the focusing lens 5) (step S12 and a step of setting a polarized light component control unit).

Subsequently, an aberration correction pattern is displayed on the liquid crystal layer of the spatial light modulator 4, and laser processing conditions are input and set (step S13). Finally, the laser processing device 1 forms a plurality of the modified spots 13 along a plurality of the virtual planes 15, and carries out laser processing (step S14 and a step of outputting laser light).

According to the laser processing device 100 described above, the axisymmetric polarizing element 150 converts linearly polarized light of the laser light L into radially polarized light or azimuthally polarized light. The radially polarized light is P-polarized light, and is incident on the object 11. In addition, the azimuthally polarized light is S-polarized light, and is incident on the object 11. For this reason, by converting the linearly polarized light into the radially polarized light or the azimuthally polarized light, it is possible to appropriately unify polarized light components of the laser light L to one of the P-polarized light and the S-polarized light, and it is possible to appropriately form one focal point.

The embodiments of the present invention have been described above, but the present invention is not limited to the embodiments. For example, the polarized light component control unit may control polarized light components of the laser light such that the laser light is focused on one point in the optical axis direction, and may not necessarily unify the polarized light components of the laser light to one of P-polarized light and S-polarized light.

REFERENCE SIGNS LIST

1, 100: laser processing device, 2: stage, 3: light source (laser output unit), 4: spatial light modulator, 5: focusing lens, 11: object (semiconductor object), 150: axisymmetric polarizing element (conversion element), L: laser light, SP1, SP2: slit pattern.

The invention claimed is:

1. A laser processing device configured to perform laser processing on a semiconductor object made of a birefringent material, by irradiating the semiconductor object with laser light, the device comprising:
    a laser output unit configured to output the laser light;
    a spatial light modulator configured to modulate the laser light output from the laser output unit;
    a focusing lens configured to focus the laser light toward the semiconductor object; and
    a polarized light component control unit configured to control polarized light components of the laser light such that the laser light is focused on one point in the semiconductor object in an optical axis direction,
    wherein the laser output unit outputs the laser light that is linearly polarized light, and
    the polarized light component control unit unifies the polarized light components of the laser light to one of P-polarized light and S-polarized light, and
    wherein the polarized light component control unit includes a conversion element configured to convert the linearly polarized light into radially polarized light or azimuthally polarized light.

2. The laser processing device according to claim 1, wherein the birefringent material is a uniaxial crystal material with a 001 plane orientation.

3. A laser processing method in which laser processing is performed on a semiconductor object made of a birefringent material, by irradiating the semiconductor object with laser light, the method comprising:
    a step of placing the semiconductor object on a stage;
    a step of setting a polarized light component control unit configured to control polarized light components of the laser light such that the laser light is focused on one point in the semiconductor object in an optical axis direction; and
    a step of outputting the laser light, wherein
    in the step of outputting the laser light, the laser light that is linearly polarized light is output, and
    in the step of setting the polarized light component control unit, a conversion element configured to convert the linearly polarized light into radially polarized light or azimuthally polarized light is disposed on an optical path.

* * * * *